(12) United States Patent
Tundlam et al.

(10) Patent No.: US 7,450,507 B2
(45) Date of Patent: Nov. 11, 2008

(54) HIERARCHAL RATE-LIMITING AT A NETWORK NODE THAT UTILIZES AN INFINITY RATE-LIMIT CHECK

(75) Inventors: Diwakar Tundlam, Sunnyvale, CA (US); Eric Anderson, Palo Alto, CA (US); Apurva Mehta, Cupertino, CA (US); Ajay Gaonkar, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1009 days.

(21) Appl. No.: 10/369,432

(22) Filed: Feb. 19, 2003

(65) Prior Publication Data

US 2003/0227872 A1 Dec. 11, 2003

Related U.S. Application Data

(60) Provisional application No. 60/386,646, filed on Jun. 5, 2002.

(51) Int. Cl.
*H04L 12/26* (2006.01)

(52) U.S. Cl. ..................... 370/232; 370/235; 370/252; 709/225

(58) Field of Classification Search ............... 370/229, 370/230, 230.1, 231–235, 252, 253; 709/223–229, 709/232
See application file for complete search history.

(56) References Cited

U.S. PATENT DOCUMENTS

| | | | | |
|---|---|---|---|---|
| 6,046,980 A * | 4/2000 | Packer | ........................ | 370/230 |
| 6,591,299 B2 * | 7/2003 | Riddle et al. | ................ | 709/224 |
| 6,744,767 B1 * | 6/2004 | Chiu et al. | ............. | 370/395.21 |
| 6,868,065 B1 * | 3/2005 | Kloth et al. | ................ | 370/236 |
| 6,999,420 B1 * | 2/2006 | Chiu et al. | ................ | 370/231 |
| 7,042,848 B2 * | 5/2006 | Santiago et al. | ............. | 370/253 |
| 2002/0089929 A1 | 7/2002 | Tallegas et al. | | |

FOREIGN PATENT DOCUMENTS

WO   WO 02/21773 A2   3/2002

* cited by examiner

*Primary Examiner*—Wing F. Chan
*Assistant Examiner*—Duc T Duong

(57) ABSTRACT

Rate-limiting a traffic stream using a rate-limit hierarchy involves subjecting a packet to a first rate-limit check, the first rate-limit check corresponding to a first-level traffic classification, subjecting the packet to a second rate-limit check and an infinity rate-limit check, the second rate-limit check and the infinity rate-limit check corresponding to a second-level traffic classification, granting an automatic pass to the packet from the infinity rate-limit check regardless of whether or not the packet passes the second rate-limit check, and granting an overall pass of the rate-limit hierarchy if the packet passes the first rate-limit check. In an embodiment, the first-level traffic classification is a parent classification of the second-level traffic classification and the second-level traffic classification is a child classification of the first-level traffic classification.

20 Claims, 7 Drawing Sheets

FIG. 1
(PRIOR ART)
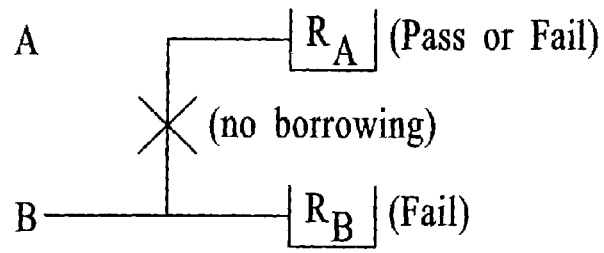
FIG. 3
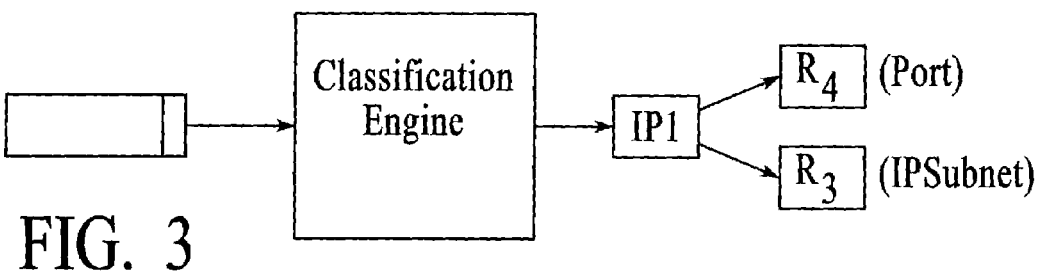
FIG. 4
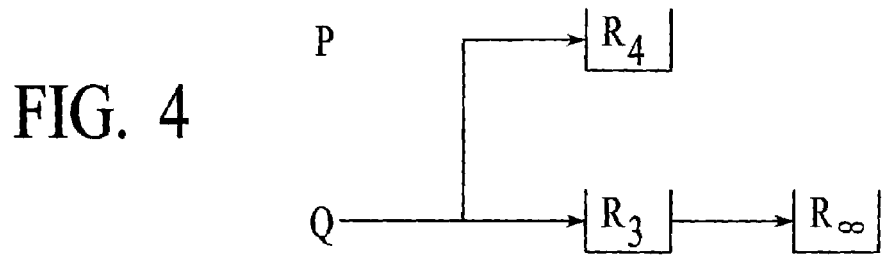
| $R_3$ | $R_\infty$ | Intermediate Result | $R_4$ | Overall Result | |
|---|---|---|---|---|---|
| P | P | P | P | P | |
| P | P | P | F | F | |
| F | P | P | P | P | ← Borrowing |
| F | P | P | F | F | |
FIG. 5

| $R_3$ | $R_{\infty_1}$ | Intermediate Result 1 | $R_2$ | $R_{\infty_2}$ | Intermediate Result 2 | $R_3$ | $R_{\infty_3}$ | Intermediate Result 3 | $R_4$ | Overall Result |
|---|---|---|---|---|---|---|---|---|---|---|
| F | P | P | F | P | P | F | P | P | P | Pass/Borrowing |
| P | P | P | F | P | P | F | P | P | P | Pass/Borrowing |
| P | P | P | P | P | P | F | P | P | P | Pass/Borrowing |
| P | P | P | P | P | P | P | P | P | P | Pass/Borrowing |
| F | P | P | P | P | P | F | P | P | P | Pass/Borrowing |
| F | P | P | P | P | P | P | P | P | P | Pass/Borrowing |
| P | P | P | P | P | P | F | P | P | P | Pass/Borrowing |
| • | • | • | • | • | • | • | • | • | • | |
| • | • | • | • | • | • | • | • | • | • | |
| • | • | • | • | • | • | • | • | • | • | |
| F | P | P | F | P | P | P | P | P | P | Pass/Borrowing |
| P | P | P | F | P | P | P | P | P | P | Pass/Borrowing |

FIG. 8

HIERARCHAL RATE-LIMITING AT A NETWORK NODE THAT UTILIZES AN INFINITY RATE-LIMIT CHECK

CROSS REFERENCE TO RELATED APPLICATION

This application is entitled to the benefit of provisional Patent Application Ser. No. 60/386,646, filed Jun. 5, 2002.

FIELD OF THE INVENTION

The invention relates to hierarchal rate-limiting at a network node, and more particularly to hierarchal rate-limiting at a network node that utilizes an infinity rate-limit check.

BACKGROUND OF THE INVENTION

Hierarchal rate-limiting is used to control the flow of traffic streams at a network node by subjecting a traffic stream to more than one rate-limit check. The number of rate-limit checks that a traffic stream is subject to typically depends on the number of classifications to which the traffic stream belongs. For example, an Hypertext Transport Protocol (HTTP) traffic stream (i.e., a WEB traffic stream) between a WEB server and a WEB browser can be classified as 'WEB' traffic based upon its Transmission Control Protocol (TCP) port number. The HTTP traffic stream can also be classified as TCP traffic based upon its Internet Protocol (IP)-protocol type. Thirdly, the HTTP traffic stream can also be classified as belonging to a specific IP-subnet based upon its source and/or destination IP addresses. Additional classifications for the same traffic stream are also possible, such as those based on the physical incoming or outgoing port of the traffic, the Type of Service (TOS), Layer 2 (L2)-fields, etc.

In a hierarchal rate-limiting scheme, the traffic stream in question must satisfy rate-limit checks for all the classifications that the traffic stream falls under in order for the traffic to be deemed as having passed the overall rate check. The overall rate check is the summation of all of the rate-limit checks in a given hierarchy. For example, WEB traffic and FTP traffic may fall under separate WEB-specific and FTP-specific classifications, while also falling under a more generic TCP classification. In this case, if there are separate rate-limit checks for WEB traffic, FTP traffic, and TCP traffic, then the WEB and FTP traffic must pass their own respective rate-limit checks as well as the TCP rate limit check to be deemed as having passed the overall check.

Problems with the hierarchal rate-limiting scheme are encountered when a certain classification of traffic is oversubscribed. In software, it is possible to provide for oversubscription of certain classifications of traffic such that when a classification exceeds its own rate limit, the classification is permitted to borrow available bandwidth from the allocated rate limit of their parent classification. A parent classification is the next higher level traffic classification in a rate-limiting hierarchy. While this type of borrowing is relatively easy to implement in software, it is much more difficult to efficiently perform the same operation in hardware. Implementing a rate-limiting borrowing scheme in hardware typically requires a "series plus parallel" check on two rate-limit buckets. A difficulty with implementing series plus parallel checks in hardware is that a check on one bucket depends on the pass or fail of the other bucket. Hardware would need to go backwards (in time) to update credits for the other parallel check depending on whether the current parallel check succeeded or not. In most cases, making hardware go backwards to update credits causes additional latency for the traffic and/or additional complexity in hardware to make the credit updates happen at the desired speeds.

FIG. 1 is a functional depiction of a conventional rate-limiting hierarchy that is implemented in hardware using for example, credit buckets. In the functional depiction of FIG. 1, traffic classification B is rate-limited by rate-limit rule $R_B$ and traffic classification A is rate-limited by rate-limit rule $R_A$. Traffic classification A is related to traffic classification B in that traffic classification A is a parent (more broad) classification with respect to traffic classification B (a child classification). Traffic in class B must pass both rate-limit checks, i.e. $R_A$ and $R_B$, before the traffic can receive an overall pass. If a packet fails rate-limit rule $R_B$, then the packet fails the overall rate check regardless of the outcome of the $R_A$ check. That is, regardless of whether or not there is bandwidth available in traffic classification A that could be borrowed by traffic in traffic classification B, the traffic in traffic classification B will not pass the overall rate check if the packet fails $R_B$. Therefore, without the availability to borrow available bandwidth from parent traffic classifications, hierarchal rate-limiting schemes face severe performance limitations. While it may be possible to design complex hardware logic to achieve borrowing, complex hardware logic is not efficient in terms of chip real estate and processing resources.

Therefore, in view of the need for efficient hierarchal rate-limiting, a hardware-based bandwidth borrowing scheme is needed.

SUMMARY OF THE INVENTION

A technique for rate-limiting a traffic stream using a rate-limit hierarchy involves utilizing infinity rate limiting rules at child classification levels to allow borrowing of available bandwidth from a rate-limit rule in a parent classification. The infinity rate-limit rules at the child classification levels grant an automatic "pass" at each child classification level regardless of the outcome of the actual rate-limit check of the child classification level. As a result of the automatic passes at each child classification, a packet is granted an overall pass if the packet passes the rate-limit check at the parent classification level.

An embodiment of a method for rate-limiting a traffic stream using a rate-limit hierarchy involves subjecting a packet to a first rate-limit check, the first rate-limit check corresponding to a first-level traffic classification, subjecting the packet to a second rate-limit check and an infinity rate-limit check, the second rate-limit check and the infinity rate-limit check corresponding to a second-level traffic classification, granting an automatic pass to the packet from the infinity rate-limit check regardless of whether or not the packet passes the second rate-limit check, and granting an overall pass of the rate-limit hierarchy if the packet passes the first rate-limit check. In an embodiment of the method, the first-level traffic classification is a parent classification of the second-level traffic classification and the second-level traffic classification is a child classification of the first-level traffic classification.

An embodiment of a system for rate-limiting a traffic stream using a rate-limit hierarchy includes a classification engine, a rule selection engine, first level-specific rule logic, second level-specific rule logic, and hierarchal rule logic. The classification engine is configured to identify a traffic classification of a packet. The rule selection engine is configured to identify rules that apply to the traffic classification identified by the classification engine. The first level-specific rule logic is configured to subject the packet to a first rate-limit rule, the first rate-limit rule selected by the rule selection engine, the first rate-limit rule corresponding to a first-level traffic classification, and wherein the first level-specific rule logic determines an intermediate result for the packet at the first-level traffic classification in response to results of the first rate-limit. The second level-specific rule logic is configured to subject the packet to a second rate-limit rule, the second rate limit rule selected by the rule selection engine, the second rate-limit rule corresponding to a second-level traffic classification, wherein the second level-specific rule logic further comprises an infinity rate-limit rule logic, the infinity rate-limit rule logic granting an automatic pass to the packet in the second-level traffic classification regardless of whether or not the packet passes the second rate-limit rule, and wherein the second level-specific rule logic determines an intermediate result for the packet at the second-level traffic classification in response to results of the second rate-limit rule and results of the infinity rate-limit rule logic. The hierarchal rule logic is configured to determine an overall result of the rate-limit hierarchy in response to intermediate results determined by the first and second level-specific rule logic.

Utilizing infinity rate-limit rules to allow borrowing of bandwidth from an infinity rate-limit check enables more efficient combinatorial rate limiting (i.e., for packets belonging to more than one classification of traffic) and enables hierarchal rate-limiting to be implemented economically, efficiently, and with minimal packet latency in hardware.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a functional depiction of a conventional rate-limiting hierarchy that is implemented in hardware using for example, credit buckets.

FIG. 3 depicts an example of an incoming packet being given a traffic classification and rate-limiting rules being selected for all of the traffic classifications that pertain to the incoming packet, according to an embodiment of the invention.

FIG. 4 is a functional depiction of an example of a two-level rate-limiting hierarchy that utilizes an infinity rate-limit rule to allow the borrowing of available bandwidth from the parent classification according to an embodiment of the invention.

FIG. 5 is a table that represents possible outcomes of the rate-limiting operation described with reference to FIG. 4 above, according to an embodiment of the invention.

FIG. 8 is a table that represents a selection of possible outcomes of the rate-limiting operation described with reference to FIG. 7 above, according to an embodiment of the invention.

DETAILED DESCRIPTION OF THE INVENTION

Figure 2:
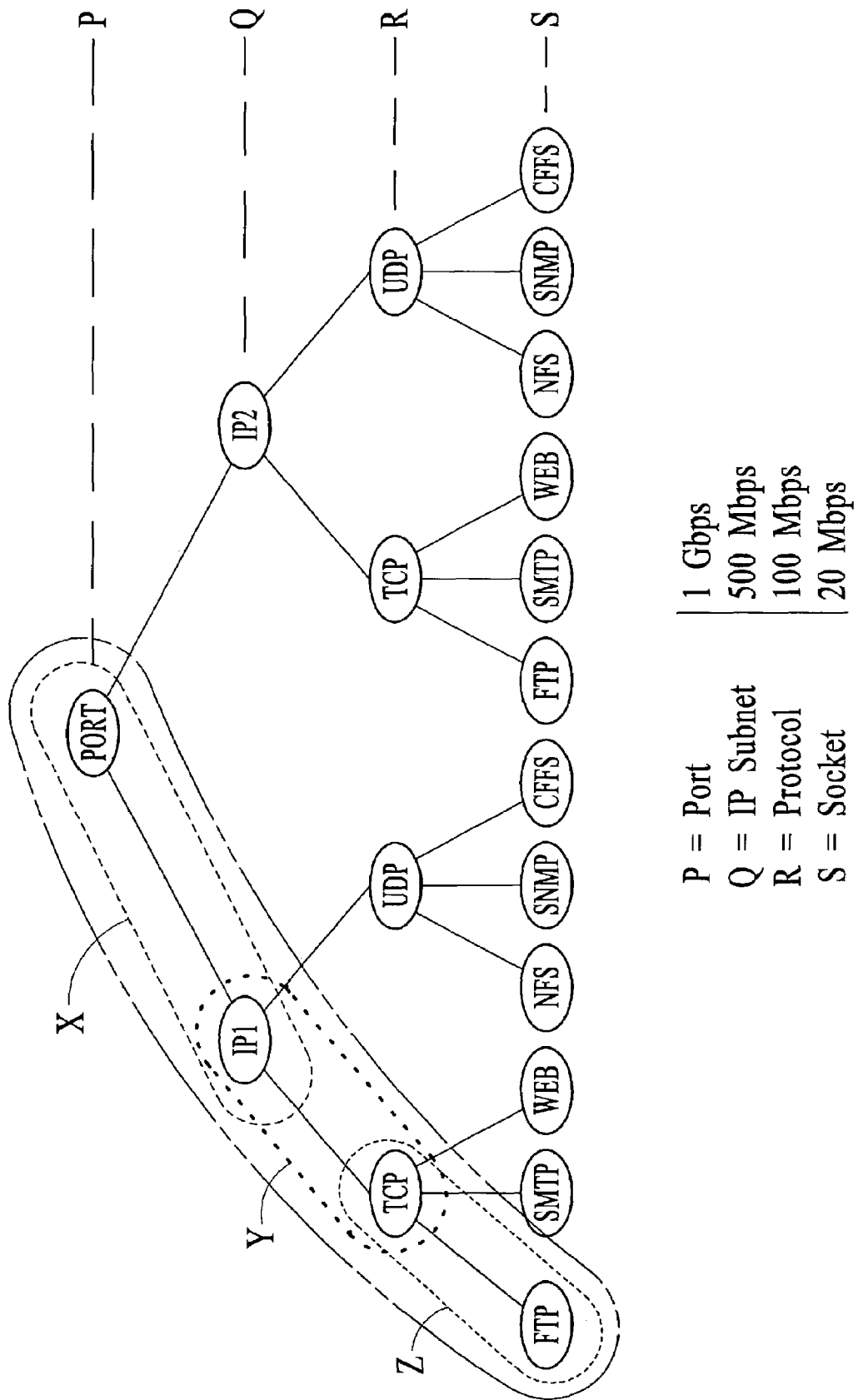
FIG. 2 is an example of a traffic classification hierarchy suitable to be used for hierarchal rate-limiting, according to an embodiment of the invention.

FIG. 2 is an example of a traffic classification hierarchy suitable to be used for hierarchal rate-limiting, according to an embodiment of the invention. In the example depicted in FIG. 2, there are four traffic classification levels; P, Q, R, and S. The "P" level is the highest (i.e. most broad) level in the traffic classification hierarchy and corresponds to the port level, i.e., the physical port level. The "Q" level is the second highest level (i.e., narrower than the highest level) in the traffic classification hierarchy and corresponds to the Internet Protocol (IP) subnet level. The "R" level is the third highest level (i.e., narrower than the second highest level) in the traffic classification hierarchy and corresponds to the protocol level. The "S" level is the fourth highest level (i.e., narrower than the third highest level) in the traffic classification hierarchy and corresponds to the socket level. The traffic classification hierarchy described with reference to FIG. 2 is exemplary only. Other traffic classification hierarchies are also contemplated.

Within a given traffic classification hierarchy, there is a relatedness between the various classification levels. The term "parent classification level" shall be used herein to describe a traffic classification level that is one level higher in the traffic classification hierarchy than a "child classification level". For example, in the embodiment depicted with reference to FIG. 2, traffic classification level P is a parent classification level with respect to traffic classification level Q, and traffic classification level Q is a parent classification level with respect to traffic classification level R. Similarly, traffic classification level R is a parent classification level with respect to traffic classification level S. A packet that belongs to a given traffic classification level, also belongs to the parent classification level, if there is one, as well as any other higher level traffic classification levels (i.e., "grandparent" classification levels, "great grandparent" classification levels, etc.) if they exist. In FIG. 2, sets of parent and child classification levels are enclosed by the three smaller dashed ovals. The top dashed oval, "X", encloses the port and Internet Protocol (IP) subnet (i.e., IP1) levels. The middle dashed oval, "Y", encloses the IP1 level and the protocol level, which in this case is Transmission Control Protocol (TCP). The bottom dashed oval, "Z", encloses the TCP level and the socket level, which in this case is File Transfer Protocol (FTP).

In the key depicted at the bottom of FIG. 2, example rate limits are depicted for each of the four traffic classification levels. The terms "overall rate-limit check" and "overall check" will be used herein to mean the summation of all of the rate-limit checks in a given rate-limiting hierarchy. The terms "overall pass" and "overall fail" refer to passing and failing an overall check, respectively. A rate-limit check is the application of a rate-limit rule to a packet. In an embodiment, in a hierarchal rate-limiting scheme, an incoming packet must satisfy all of the rate-limit checks that apply to the packet in order for the packet to pass the overall check. That is, if one of the rate-limit checks fails, then the packet receives an overall fail.

FIG. 3 depicts an example of an incoming packet being given a traffic classification and rate-limiting rules being selected for all of the traffic classifications that pertain to the incoming packet, according to an embodiment of the invention. In the embodiment depicted in FIG. 3, the packet is classified as belonging to the class IP1 by the classification engine. The traffic classification IP1 corresponds to the traffic classification level Q (i.e., IP subnet level) of the traffic classification hierarchy depicted in FIG. 2. The traffic classification rules that pertain to the classified packet are selected as the traffic classification rules that pertain to traffic classification levels P and Q, as described with reference to FIG. 2, because packets belonging to the child classification level Q also belong to the parent classification level P. Therefore, with reference to the key depicted in FIG. 2, the particular rate-limit rules that apply to the classified packet are that the traffic at the IP subnet (IP1) level, Q, must not exceed 500 Megabits per second and the overall traffic at the port level, P, must not exceed 1 Gigabit per second.

FIG. 4 is a functional depiction of an example of a two-level rate-limiting hierarchy that utilizes an infinity rate-limit rule to allow the borrowing of available bandwidth from the parent classification according to an embodiment of the invention. The functional depiction includes $R_3$ and $R_\infty$ at the Q level and $R_4$ at the P level. The symbol $R_\infty$ is used herein to represent infinity rate-limit checks. In order to receive an overall pass, a packet must receive a pass at each traffic classification level. If the packet does not receive a pass at a given traffic classification level, then it will receive an overall fail. The infinity rate-limit rule extends the life of the packet so that the ultimate determination of whether or not to grant an overall pass to the packet is made in a higher classification level than the traffic classification level in which the packet did not receive a pass. That is, the infinity rate-limit rule grants an automatic pass to the packet at the child classification level regardless of the outcome of the rate-limit check of the child classification level, i.e., $R_3$. By granting an automatic pass to the packet at the child classification level, the infinity rate-limit rule enables available bandwidth to be borrowed from the parent classification level so that the packet receives an overall pass, regardless of whether the packet passed the rate-limiting rule of the child classification level.

In a hardware embodiment, the available bandwidth at the different classification levels is managed using "credit bucket" algorithms. In a credit bucket algorithm, each credit provides permission to forward a certain number of bits within a network. A credit bucket holds credits for a particular class of network traffic and credits are added into the bucket at a specified rate. For example, a fixed number of credits are added to the credit bucket at fixed time intervals. To forward a packet, a number of credits equal in bit size to the packet must be removed from the bucket. For example, if each credit represents 1,000 bits then a packet of 100,000 bits will have an equivalent credit value of 100 credits. If the number of credits in the bucket is equal to or exceeds the credit requirement of the packet, then the packet is forwarded. If, however, the number of credits in the bucket is below the credit requirement of the packet, then the packet is either held until the bucket has enough credits to forward the packet or the packet is dropped. In an embodiment, borrowing a credit involves appropriating traffic forwarding capability ("available bandwidth") from a higher traffic classification level rate-limit rule. It should be appreciated that, although packet forwarding and dropping are discussed herein, the use of credit buckets can achieve rate-limiting in ways other than forwarding and dropping packets, such as marking packets.

In the embodiment depicted in FIG. 4, level P, the parent classification level, rate-limits traffic by rate-limiting rule $R_4$. The child classification level, level Q, rate-limits traffic by rate-limiting rule $R_3$. Child classification level Q also handles traffic using the infinity rate-limiting rule, $R_\infty$. As described above, the infinity rate-limit rule grants an automatic pass to the packet at the child classification level. That is, regardless of whether or not the packet passes rate-limiting rule $R_3$, the packet will receive a pass at the child classification level because the infinity rate-limit rule grants an automatic pass to the packet. Borrowing of credits from rate-limiting rule $R_4$ so that the packet receives an overall pass is thus allowed if the packet passes $R_4$ (i.e., there is available bandwidth at the highest traffic classification level). In an embodiment, rate-limit checks are performed in parallel for all traffic classification levels.

FIG. 5 is a table that represents possible outcomes of the rate-limiting operation described with reference to FIG. 4 above, according to an embodiment of the invention. The table is read in rows from left to right. In the table, a "P" represents a pass of the respective rate-limit check and an "F" represents a fail of the respective rate-limit check. Also in the table, "intermediate result" is the combined result for a child or lower level traffic classification level, i.e. the intermediate result is the combined result of rate-limit rule $R_3$ and the infinity rate-limit rule for traffic classification level Q. With respect to the intermediate result, if either rate-limit rule $R_3$ or the infinity rate-limit rule results in a pass, then the intermediate result is a pass. The "overall result" column describes the ultimate outcome of the packet, i.e., whether it passes or fails the overall rate-limit check. In FIG. 8 below, like terms and symbols to those used in FIG. 5 have similar meanings.

Referring FIG. 5, in the first row, the packet passes all of the rate-limit rules, so the overall result is a pass. In the second row, the packet passes both of the rate-limit rules of the child classification level, $R_3$ and the infinity rate-limit rule, however, it fails the parent classification level rate-limit rule $R_4$, and therefore the overall result is a fail. In the third row, the packet fails rate-limit rule $R_3$, but receives an automatic pass from the infinity rate-limit rule. Therefore, the life of the packet is extended because the intermediate result is a pass. Additionally, the packet receives a pass from the parent classification level rate-limit rule $R_4$ and the overall result is that the packet passes the overall rate-limit check. Because the packet receives a pass from the rate-limit rule of the parent classification, i.e., $R_4$, bandwidth from the parent classification level is consumed by (i.e., "borrowed from" by) traffic from the child classification level. Thus, the example depicted in the third row exhibits borrowing, as indicated by the word "borrowing" to the right of the row. That is, although child classification level rate-limit rule $R_3$ resulted in a failure, due to the automatic pass granted by the infinity rate-limit rule an intermediate pass results and credits can be borrowed from the parent classification level rate-limit rule $R_4$ so that the packet receives an overall pass. In the fourth row, as in the third, the packet fails rate-limit rule $R_3$, but receives an automatic pass from the infinity rate-limit rule. Therefore, the life of the packet is extended because the intermediate result is a pass. However, the packet fails the parent classification level rate-limit rule $R_4$ (no extra bandwidth available) and the result is that no borrowing is allowed, and the packet receives an overall fail as its overall result. Therefore, the example depicted in the fourth row exhibits that although the infinity rate-limit rule granted an automatic pass to the packet at the child classification level, the ultimate arbiter of whether the packet can be forwarded is the highest level rate-limit rule, in this case, $R_4$.

In an embodiment, the rate-limit rules described herein with reference to FIGS. 2-10 are implemented in hardware, for example, using credit buckets. It is relatively easy to implement the disclosed rate-limiting scheme in hardware because of the simplicity of storing and processing the results of the rate-limit checks. That is, in an embodiment, each rate-limit check yields a binary result, i.e., a "1" for a pass and a "0" for a fail. Additionally, each intermediate result is binary. Therefore, the overall result is determined by a simple evaluation of whether or not all of the intermediate results as well as the rate-limit check of the highest traffic classification level were a pass. If the evaluation yields all passes, then the overall result is a pass. If the evaluation yields any fails, then the overall result is a fail. In an embodiment, the individual rate-limit checks are all computed simultaneously (in parallel) in hardware on a particular packet during what can be termed as a "first stage." The results of "first stage" checks are examined in what can be termed as a "second stage." In the "second stage," a decision is made for the packet based on all the results obtained from the "first stage." Additional parameters guide which of multiple passing rate-limit checks will eventually contribute to deciding how to mark the packet (i.e., drop, mark etc.) in the "second stage."

FIGS. 6A-6D are embodiments of four different packets being independently classified and rate-limit rules for applicable traffic classifications being selected according to the functions described with reference to FIG. 3. In each of the FIGS. 6A-6D, after the packet is classified by the classification engine, i.e. given a traffic classification level, rate-limit rules for all of the traffic classification levels that pertain to the packet are selected.

Figure 6A:
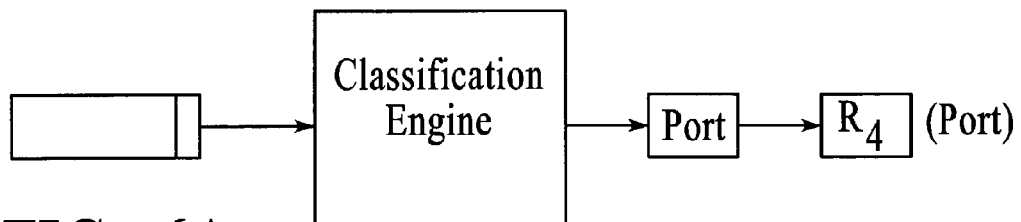
FIGS. 6A-6D are embodiments of four different packets being independently classified and rate-limit rules for applicable traffic classifications being selected according to the functions described with reference to FIG. 3, according to an embodiment of the invention.

FIG. 6A depicts an embodiment of an incoming packet being classified in the port traffic classification level. Since, in the example traffic classification hierarchy depicted in FIG. 2, the port level is the highest level, only to rate-limiting rule $R_4$, which corresponds to the port level, is selected for the packet.

Figure 6B:
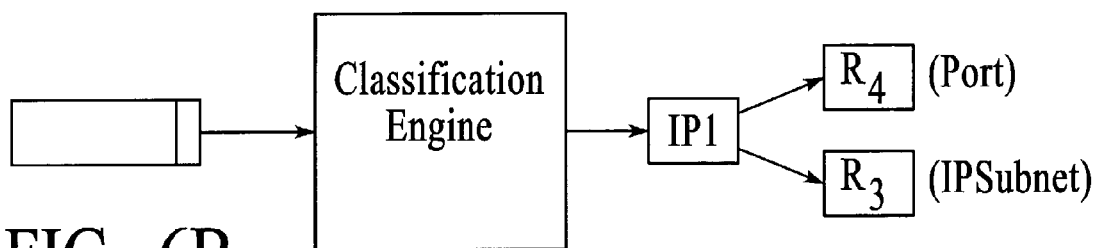

FIG. 6B depicts an embodiment of an incoming packet being classified in the IP subnet level, as IP 1, and the IP subnet level rate-limit rule $R_3$ as well as the port level rate-limit rule $R_4$ being selected for the packet. The port level rate-limit rule $R_4$ applies to the packet because the port level is the parent classification level to the IP subnet level.

Figure 6C:
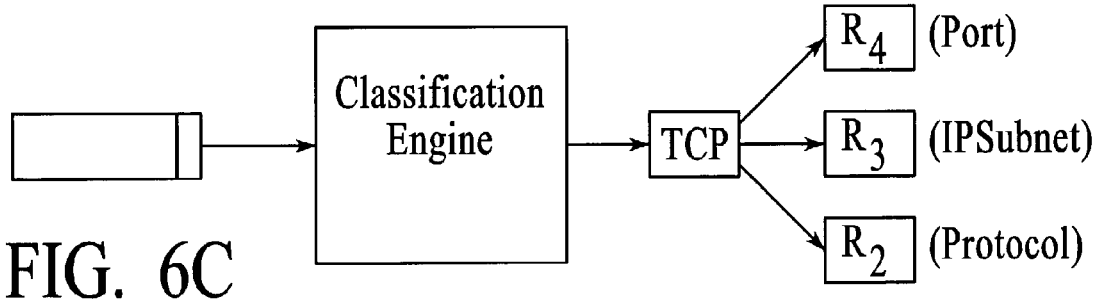

FIG. 6C depicts an embodiment of an incoming packet being classified in the protocol level as TCP. The protocol level rate-limit rule $R_2$ is selected for the packet. The IP subnet level rate-limit rule $R_3$ and the port level rate-limit rule $R_4$ are also selected for the packet, because the IP subnet level and the port level are parent and grandparent classification levels, respectively, to the protocol level.

Figure 6D:
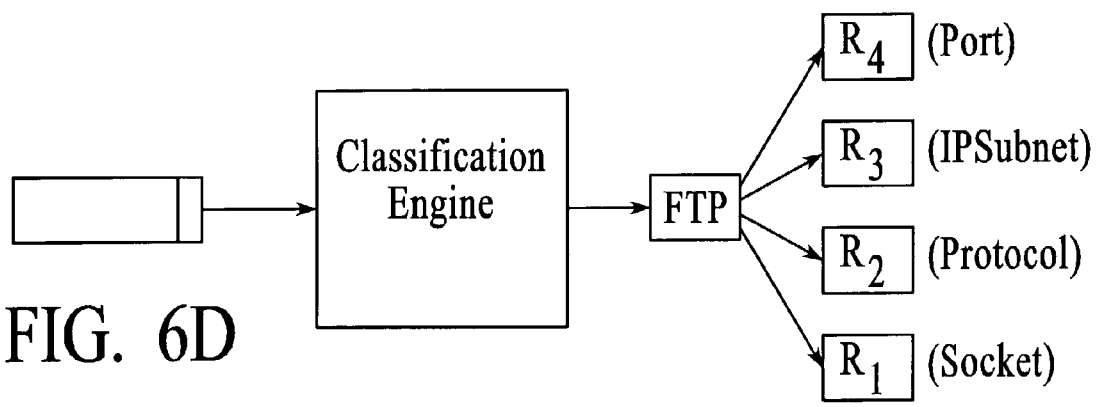

FIG. 6D depicts an embodiment of an incoming packet being classified in the socket level as FTP. The socket level rate-limit rule $R_1$ is selected for the packet. The protocol level rate-limit rule $R_2$ the IP subnet level rate-limit rule $R_3$, and the port level rate-limit rule $R_4$ are also selected for the packet because the protocol level, the IP subnet level and the port level are parent, grandparent, and great grandparent classification levels, respectively, to the protocol level.

Figure 7:
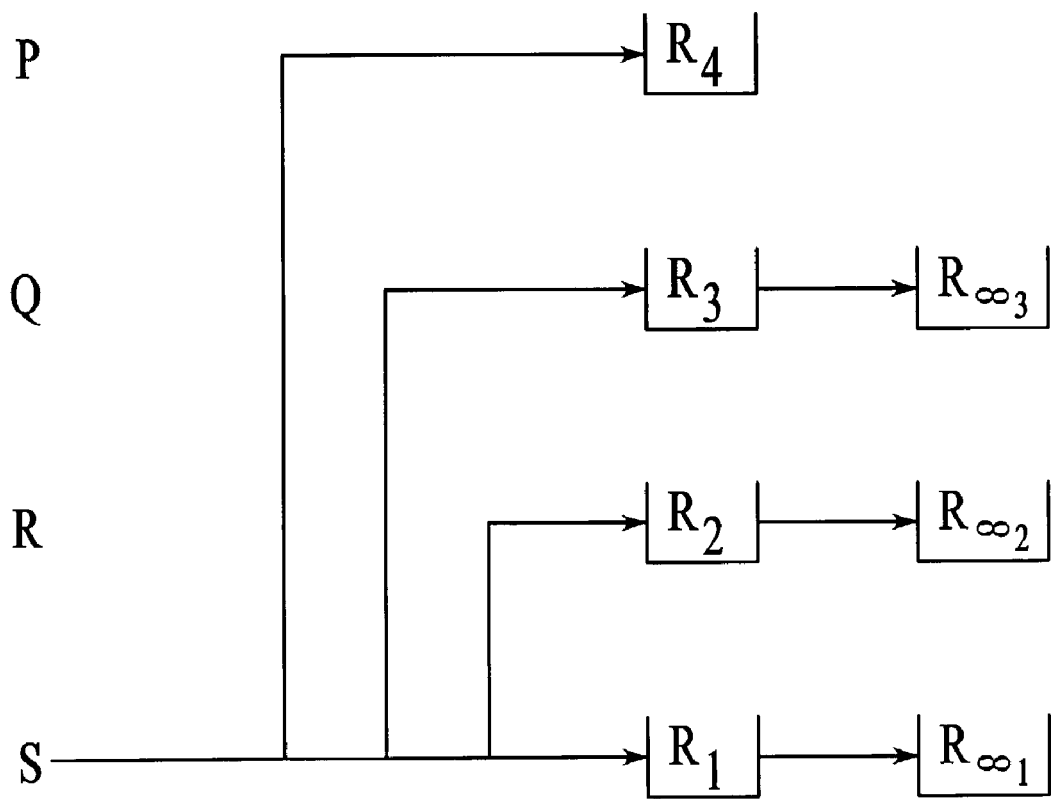
FIG. 7 is a functional depiction of the rate-limit rules that are applied to the packet described with reference to FIG. 6D, according to an embodiment of the invention.

FIG. 7 is a functional depiction of the rate-limit rules that are applied to the packet described with reference to FIG. 6D. The functional depiction includes multiple infinity rate-limit rules to enable borrowing all the way up the rate-limiting hierarchy in accordance with an embodiment of the invention. The rate-limiting performed with respect to FIG. 7 operates in the same manner as the rate-limiting performed with respect to FIG. 4, with the exception that FIG. 7 depicts a four level rate-limiting hierarchy, as opposed to the two level rate-limiting hierarchy depicted in FIG. 4.

In the embodiment depicted in FIG. 7, each traffic classification level has an infinity rate-limit rule, except for the highest traffic classification level, level P. This means that the rate-limit rule that pertains to level P, that is $R_4$, is the ultimate arbiter of whether or not the packet passes the overall rate-limit check. An incoming packet will receive an automatic pass at traffic classification levels Q, R, and S due to the operation of the infinity rate-limit rules at traffic classification levels Q, R, and S. However, at traffic classification level P, there is no automatic pass granted because there is no infinity rate-limit rule. Therefore, to receive a pass at traffic classification level P, the packet must pass rate-limit rule $R_4$. Further, since, in a hierarchal rate-limiting scheme, a packet must receive a pass at every traffic classification level in order to receive an overall pass, the packet must receive a pass at rate-limit rule $R_4$. If the packet does receive a pass at rate-limit rule $R_4$, then the lower level rate-limiting rules, i.e., $R_3$, $R_2$, and $R_1$, are able to borrow credits from rate-limit rule $R_4$ and the packet receives an overall pass. If the packet does not receive a pass at rate-limit rule $R_4$, then the packet receives an overall fail. Where the packet fails the rate-limit rule of the highest traffic classification level, no borrowing is allowed.

FIG. 8 is a table that represents a selection of possible outcomes of the rate-limiting operation described with reference to FIG. 7 above, according to an embodiment of the invention. The selections include only outcomes that result in borrowing. In each of the rows of the table, the packet fails at least one of the lower-level rate-limit checks and would therefore not have received an overall pass if the infinity rate-limit rule had not granted an automatic pass to the packet to extend the life of the packet. Nevertheless, the ultimate determination of whether to allow the packet to be forwarded rests with the highest traffic classification level rate-limit rule (i.e., $R_4$). Since the packet passed rate limit rule $R_4$ in all of the selected cases depicted in the table of FIG. 8, borrowing is allowed and the packet receives an overall pass in each case. For example, in the first row, borrowing is allowed even though the packet failed rate-limit rules $R_1$, $R_2$, and $R_3$. That is, the packet failed rate-limit rules $R_1$, $R_2$, and $R_3$, but the corresponding infinity rate-limit rules extended the life of the packet at each traffic classification level by granting automatic passes to the packet. Therefore, the intermediate results "Int.$_1$", "Int.$_2$", and "Int.$_3$" are all passes. Because the packet passes rate-limit rule $R_4$, borrowing is allowed so that the packet receives an overall pass. In an embodiment, only "passing" buckets have credits deducted. In the above case, where a packet fails $R_1$, $R_2$ and $R_3$, the buckets related to rate-limit rules $R_1$, $R_2$ and $R_3$ do not have credits deducted. Credits are deducted from the infinity buckets corresponding to rate-limit rules $R_1$, $R_2$, and $R_3$ but, because the infinity bucket has an infinite rate, the credits are replenished immediately. In an embodiment, the only difference between a packet passing or failing an intermediate rate-limit check is the resulting marking the packet gets. For example, it rate-limit rule $R_1$ passes its check then the resulting marking relates to rate-limit rule $R_1$ and if the rate-limit rule $R_1$ fails its check (and the infinity rate-limit rule passes), then the resulting marking relates to the infinity rate-limit rule.

In the other examples exhibited in the rows of FIG. 8, borrowing is allowed wherever a packet fails a rate-limit rule due to the operation of the infinity rate-limit rules and also due to the fact that all of the packets referenced in the table passed the highest traffic classification level rate limit rule. Thus, the result in each case is "pass/borrowing" as depicted in the "overall result" column. Borrowing enables those packets that pass the highest-level rate-limit check to receive an overall pass, despite the failure of one or more lower level rate-limit checks. Therefore, all of the packets referenced in the table receive overall passes.

Figure 9:
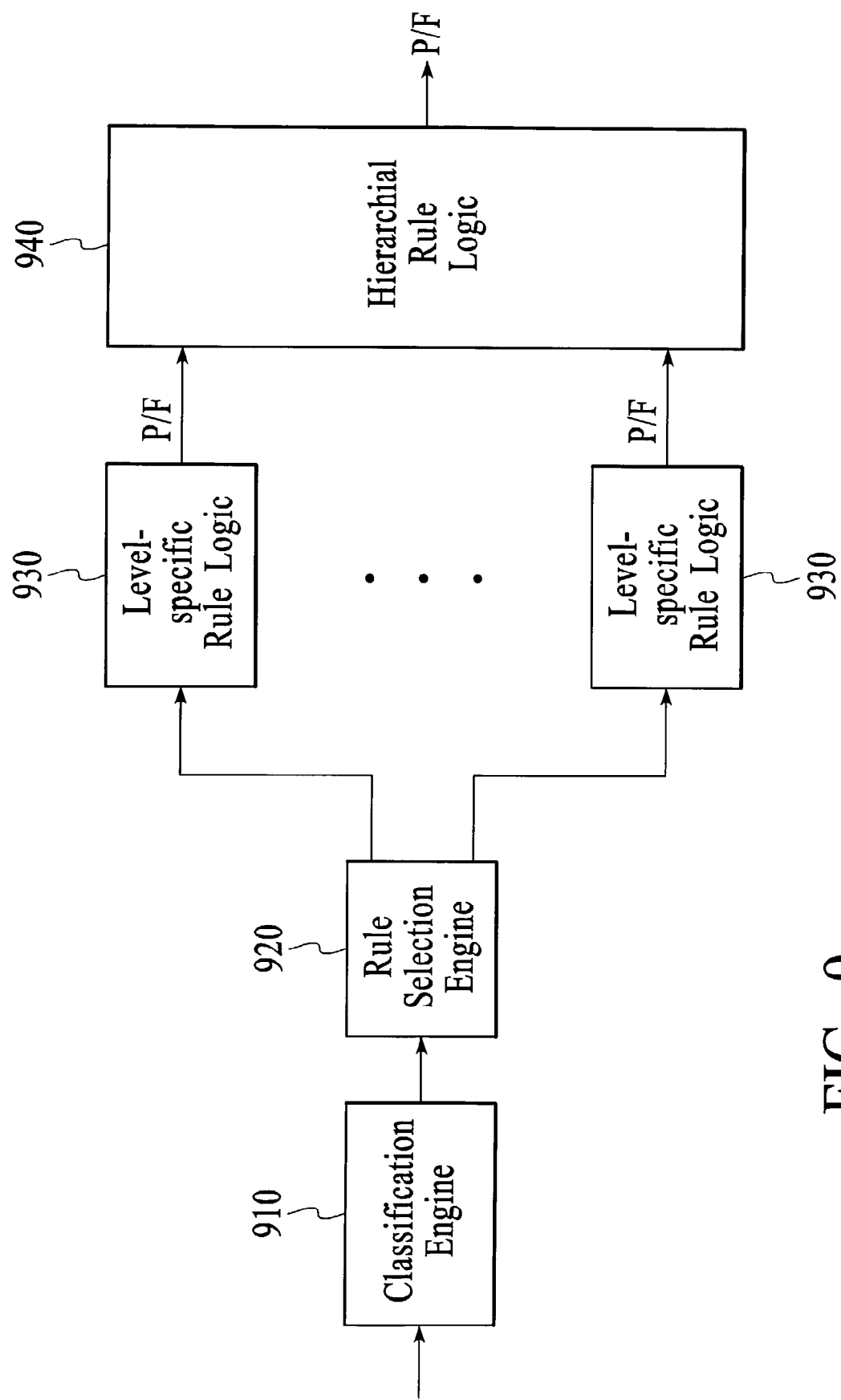
FIG. 9 depicts the functional elements of a system for implementing rate limiting using the above-described techniques, according to an embodiment of the invention.
Figure 10:
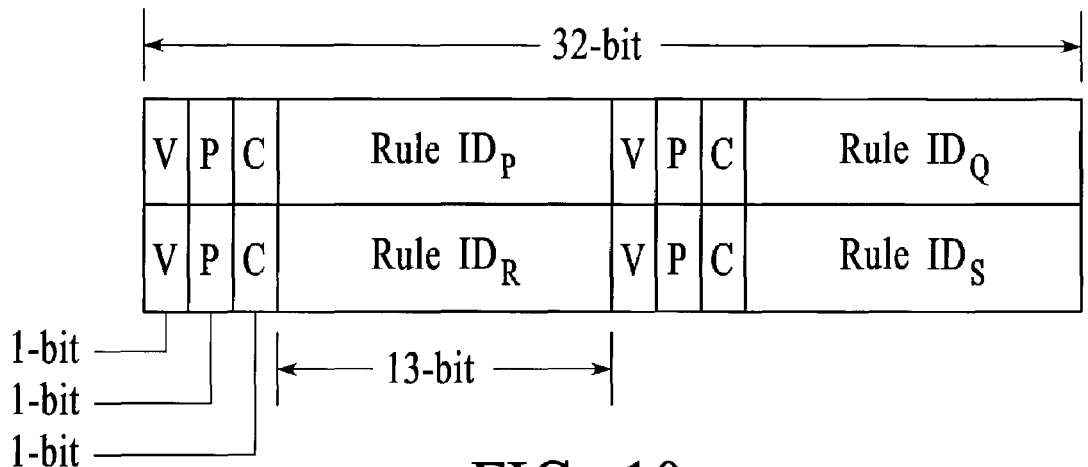
FIG. 10 depicts an embodiment of a rule selection element that is stored in a hardware-based rule selection table in accordance with an embodiment of the invention.

FIG. 9 depicts the functional elements of a system for implementing rate limiting using the above-described techniques, according to an embodiment of the invention. In an embodiment, the system is implemented in hardware, for example in application specific integrated circuits (ASICs). The functional elements include a classification engine 910, a rule selection engine 920, level-specific rule logic 930, and hierarchal rule logic 940. In an embodiment, the classification engine 910 classifies incoming traffic according to the operations described with reference to FIGS. 3 and 6A-6D. The classification engine may be implemented in hardware using, for example, a content addressable memory (CAM). In the embodiment of FIG. 8, the output of the classification engine is a pointer into the rule selection engine. In an embodiment, the rule selection engine 920 identifies rules that apply to the classification of traffic that was determined by the classification engine. In an embodiment, the pointer output from the classification engine is used to index into a hardware-based rule selection table that includes multiple rule selection elements. In an embodiment, each rule selection element contains a list of bucket indices that the packet must pass, along with indications on whether the packet should pass these bucket checks in series or in parallel. Parallel checks are used to implement the hierarchical rate-limiting scheme, with one bucket being designated for the most-specific classification, and subsequent buckets being shared among other packets that are classified into more general classifications. FIG. 10 depicts an embodiment of a rule selection element that is stored in a hardware-based rule selection table. The rule selection element includes four rule-specific fields, one for each level in the traffic classification hierarchy. In the embodiment of FIG. 10, each rule-specific field includes a "valid" field (1 bit), a "paired" field (1 bit), a "chained" field (1 bit), and a "RuleID" field (13 bits). Note, in this embodiment, 2 of the 13 bits are unused. The valid field identifies if the respective rule is valid (i.e., activated). The "paired" field identifies whether the rule should be implicitly made serial with (i.e., "paired" with) another rule, referred to herein as an implicit RuleID). In this embodiment, the implicit RuleID is identified by a fixed index offset. The "paired" field allows more than one rate-limit rule to be identified by each rule-specific field. The "chained" field identifies whether an identified rule should be linked with the next identified rule in the rule selection element. For example, setting the "chained" bit for $RuleID_P$ will cause $RuleID_Q$ to behave as a single rate-limit check (assuming the rule-specific fields are ordered as $RuleID_P$, $RuleID_Q$, $RuleID_R$, and $RuleID_S$). Combined with the functionality of the paired field, two chained RuleIDs can link up to four different rate-limit rules. In this embodiment, when the chained bit is OFF, each RuleID is independently checked in parallel. The "RuleID" field is a pointer that identifies the location of the associated rule logic.

In an embodiment, the level-specific rule logic 930 carries out checks of traffic using the rules selected by the rule selection engine. In an embodiment, each level-specific rule logic includes logic for each rule in the respective classification level plus a processor that is generic to the respective classification level. In another embodiment, each level-specific rule logic includes infinity rate-limit rule logic. The infinity rate-limit rule logic operates infinity rate-limit rule checks according to the embodiments described with reference to FIGS. 2-9. In an embodiment, the infinity rate-limit rule logic is not implemented in the level-specific rule logic of the highest classification level. In yet another embodiment, the level-specific rule logic includes a result logic which generates an intermediate result for the respective classification level in response to rate-limit checks performed at the respective classification level. As explained above, the CAM "result" has a list of buckets to pass the packet through along with a choice of the manner in which the checks are to be done. By programming the list of buckets to include more than one parallel "pairs" of buckets, with each pair including a designated bucket and a corresponding Infinity bucket. The "last" pair may or may not really be a "pair". In some cases, the packets that entirely fail the overall combined rate-limit check are passed by "pairing" the last bucket with an infinity bucket. The packets are "passed," but with a "marking" that essentially makes the packet 'lowest' priority, which may eventually cause the packet to be dropped later within the system.

In an embodiment, the hierarchal rule logic 940 determines an overall result in response to the intermediate results from the various levels of level-specific rule logic. In an embodiment, level-specific rule logic from each classification level must return an intermediate result of a "pass" in order for the overall result to be a pass. This can be implemented in hardware with the two simple "AND" logic. In sum, the hierarchal rule logic implements the "second stage" check, which involves collating the intermediate results to build a "final result."

Figure 11:
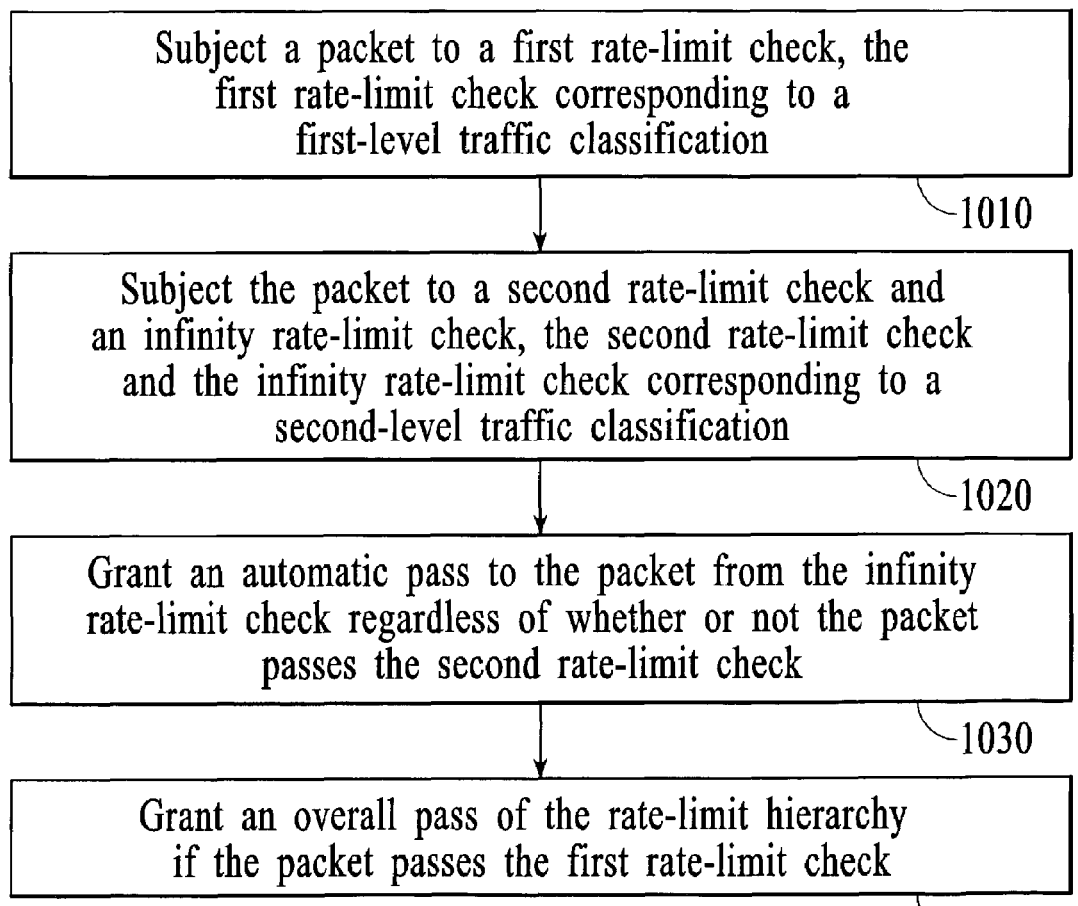
FIG. 11 is a flow diagram of an embodiment of a method for rate-limiting a traffic stream using a rate-limit hierarchy at a network node, according to an embodiment of the invention.

FIG. 11 is a flow diagram of an embodiment of a method for rate-limiting a traffic stream using a rate-limit hierarchy at a network node, according to an embodiment of the invention. At block 1110, a packet is subjected to a first rate-limit check, the first rate-limit check corresponding to a first-level traffic classification. At block 1120, the packet is subjected to a second rate-limit check and an infinity rate-limit check, the second rate-limit check and the infinity rate-limit check corresponding to a second level traffic classification. At block 1130, an automatic pass is granted to the packet from the infinity rate-limit check regardless of whether or not the packet passes the second rate-limit check. At block 1140, an overall pass of the rate-limit hierarchy is granted if the packet passes the first rate-limit check.

In an additional embodiment, when rate-limit rules are being applied to a packet, priority information related to a rate-limit rule can be associated with the packet. That is, in an embodiment, each rate-limit rule has a priority ranking with respect to the other rate-limit rules in the hierarchy. The priority rankings are used to dictate the selection of priority information to be associated with the packet. In an embodiment, the priority information to be associated with the packet is Rate-limiting Priority Information (RLPI). The priority information that has been associated with the packet can be used in subsequent processing of the packet. For example, the priority information can be used in a Random Early Detection (RED) scheme.

In an embodiment, the rate-limiting priority information is a function of passed rate-limit checks. In another embodiment, the rate-limiting priority information is related to a most specific, i.e., lowest level, traffic classification, It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for rate-limiting a traffic stream using a rate-limit hierarchy at a network node comprising:
   subjecting a packet to a first rate-limit check, said first rate-limit check corresponding to a first-level traffic classification;
   subjecting said packet to a second rate-limit check and an infinity rate-limit check, said second rate-limit check and said infinity rate-limit check corresponding to a second-level traffic classification;

granting an automatic pass to said packet from said infinity rate-limit check regardless of whether or not said packet passes said second rate-limit check; and granting an overall pass of said rate-limit hierarchy if said packet passes said first rate-limit check, even if said packet fails said second rate-limit check.

2. The method of claim 1 further comprising granting an overall fail of said rate-limit hierarchy if said packet does not pass said first rate-limit check.

3. The method of claim 1 wherein said first rate-limit check, said second rate-limit check, and said infinity rate-limit check are implemented in hardware.

4. The method of claim 3 wherein said first rate-limit check, said second rate-limit check, and said infinity rate-limit check are implemented in parallel.

5. The method of claim 1 wherein said subjecting said packet to said first rate-limit check and said subjecting said packet to said second rate-limit check and said infinity rate-limit check are performed in parallel.

6. The method of claim 1 wherein granting an overall pass of said rate-limit hierarchy includes allowing available bandwidth to be borrowed from said first-level traffic classification.

7. The method of claim 1 wherein said first-level traffic classification includes traffic of said second level traffic classification.

8. The method of claim 7 wherein said first-level traffic classification is a parent classification of said second-level traffic classification.

9. The method of claim 7 wherein said first-level traffic classification is a parent classification of said second-level traffic classification and said second-level traffic classification is a child classification of said first-level traffic classification.

10. The method of claim 1 further comprising assigning rate-limiting priority information to said packet at each rate-limit check that said packet passes and using said rate-limiting priority information to prioritize handling of said packet.

11. The method of claim 10 wherein said rate-limiting priority information is a function of passed rate-limit checks.

12. The method of claim 11 wherein said rate-limiting priority information is related to a most specific traffic classification.

13. A system for rate-limiting a traffic stream using a rate-limit hierarchy at a network node comprising:

a classification engine configured to identify a traffic classification of a packet;

a rule selection engine configured to identify rules that apply to said traffic classification identified by said classification engine;

first level-specific rule logic configured to subject said packet to a first rate-limit rule, said first rate-limit rule selected by said rule selection engine, said first rate-limit rule corresponding to a first-level traffic classification, and wherein said first level-specific rule logic determines an intermediate result for said packet at said first-level traffic classification in response to results of said first rate-limit;

second level-specific rule logic configured to subject said packet to a second rate-limit rule, said second rate limit rule selected by said rule selection engine, said second rate-limit rule corresponding to a second-level traffic classification, wherein said second level-specific rule logic further comprises an infinity rate-limit rule logic, said infinity rate-limit rule logic granting an automatic pass to said packet in said second-level traffic classification regardless of whether or not said packet passes said second rate-limit rule, and wherein said second level-specific rule logic determines an intermediate result for said packet at said second-level traffic classification in response to results of said second rate-limit rule and results of said infinity rate-limit rule logic; and hierarchal rule logic configured to determine an overall result of said rate-limit hierarchy in response to intermediate results determined by said first and second level-specific rule logic.

14. The system of claim 13 wherein said level-specific rule logic further comprises a logic for each rule pertaining to said traffic classification and a processor that is generic to said traffic classification.

15. The system of claim 13 wherein said hierarchal rule logic grants an overall pass of said rate-limit hierarchy if said intermediate result at said first level-specific rule logic is a pass.

16. The system of claim 13 wherein said hierarchal rule logic grants an overall fail of said rate-limit hierarchy if said intermediate result at said first level-specific rule logic is a fail.

17. The system of claim 13 wherein said classification engine, said rule selection engine, said first level-specific rule logic, said second level-specific rule logic, and said hierarchal rule logic are embodied in hardware circuits.

18. The system of claim 13 wherein said first level-specific rule logic and said second level-specific rule logic are configured for parallel operation.

19. The system of claim 13 wherein said first level-specific rule logic relates to a classification level that is a parent of a classification level that is related to said second level-specific rule logic.

20. The system of claim 13 wherein said first level-specific rule logic and said second level-specific rule logic assign rate-limiting priority information to packets as part of said intermediate result.

* * * * *